United States Patent
Cigala et al.

[11] 3,788,155
[45] Jan. 29, 1974

[54] REINFORCED MOLDED PLASTIC PULLEYS

[76] Inventors: Vincenzo Cigala, Strada Valpiana 13; Emilio Alberto Bertinetti, via Alberto Picco 33, both of Torino, Italy

[22] Filed: Mar. 27, 1972

[21] Appl. No.: 238,330

[30] Foreign Application Priority Data
Sept. 7, 1971  Italy.............................. 69971 A/71

[52] U.S. Cl. .............................................. 74/230.01
[51] Int. Cl. ............................................. F16h 55/36
[58] Field of Search......74/230.01, 230.1, 230.8, 74/230.3; 159 R; 264/349

[56] References Cited
UNITED STATES PATENTS
| | | | |
|---|---|---|---|
| 3,142,997 | 8/1964 | Rampe | 74/230.01 |
| 3,577,494 | 5/1971 | Chisholm | 264/349 |
| 2,139,622 | 12/1938 | Lonskey | 74/230.8 |

FOREIGN PATENTS OR APPLICATIONS
| | | | |
|---|---|---|---|
| 1,100,747 | 9/1955 | France | 74/230.01 |
| 400,625 | 12/1942 | Italy | 74/230.05 |

Primary Examiner—Charles J. Myhre
Assistant Examiner—R. H. Lazarus

[57] ABSTRACT

Pulleys made of plastic material may be improved in their stress- and heat resistance by embedding within the body of the pulley and parallel to the faces thereof a diaphragm suitably made of metal, fiber glass or mixtures thereof.

5 Claims, 6 Drawing Figures

3,788,155

REINFORCED MOLDED PLASTIC PULLEYS

Field of the Invention

The present invention relates to stress - and heat-resistant pulleys made of molded plastic and having inner reinforcement and, particularly, to reinforced molded plastic pulleys for use in motor vehicles and the like.

Description of the Prior Art

It is known that pulleys, made of molded plastics and having sufficient stress resistance and other mechanical properties, are presently employed to transmit rotational motion.

When pulleys made of molded plastics, are concurrently subjected to mechanical and thermal stresses, it is indispensable to provide each detail thereof, when designing them with suitable dimensions. This applies particularly with respect to the central thickness of the disc, that is, the part comprised between the hub of the pulley and the crown, as well as with respect to the thickness of the side edges of the groove, in the case of groove pulleys, in order to avoid possible deformation of the elements of the pulley and hence avoid operational anomalies in the driving means.

Due to practical reasons, it is not always possible to increase suitably the thickness of the central crown or disc of the pulley or the thickness of the groove edges which, particularly in the case of engines for motor vehicles, must have particular mechanical strength characteristics even at temperatures relatively high with respect to the initial operating temperature.

BRIEF SUMMARY OF THE INVENTION

In order to overcome the above said drawbacks, the present invention provides a pulley, made of molded plastics, which is characterized in that within the body of the pulley a reinforcing diaphragm is embedded during the molding of the pulley, said diaphragm relating directly to the entire central portion of the pulley and extending from the hub to the crown, thus providing a rigid internal reinforcement bonded into a single body with the external plastic material.

More specifically, but not exclusively, the provisions of the present invention relate to groove pulleys, wherein the side edges thereof, defining the groove, are often of reduced thickness and, therefore, are more brittle and more liable to possible deformation. According to the invention, the reinforcement embedded within the body of the pulley terminates perimetrically in a plurality of flanges, corresponding in number to the adjoining edges of the grooves, in the pulley. These flanges are disposed so as to be diverging towards the perimetrical crown and have, in cross section, the configuration of opposed terminal bifurcations joined by a common body.

The internal embedded reinforcement of the pulley may be made of any suitable material which is capable of insuring the best performance of the pulley under operating conditions. Preferably, the reinforcement or diaphragm is made of a metal sheet suitably treated and shaped as further described in greater detail. However, the use of reinforcements made of non-metallic material, such as glass fibers or mixtures of sheets and fibers, and the use of reinforcements formed by nets of metal or other material, are not excluded.

THE DRAWINGS

These objects and features of the present invention will become more apparent from the following detailed embodiments and with reference to the accompanying exemplary drawings, in which:

FIGS. 1 and 2 are a top view and a cross-sectional view, respectively, of a preferred shape of the diaphragm forming the internal reinforcement of a groove pulley;

FIGS. 3 and 4, similarly to FIGS. 1 and 2, illustrate a pulley provided with said reinforcement; and FIGS. 5 and 6, similarly to the preceding figures, illustrate another pulley completely reinforced.

DETAILED DESCRIPTION OF THE EMBODIMENTS

Figure 1:
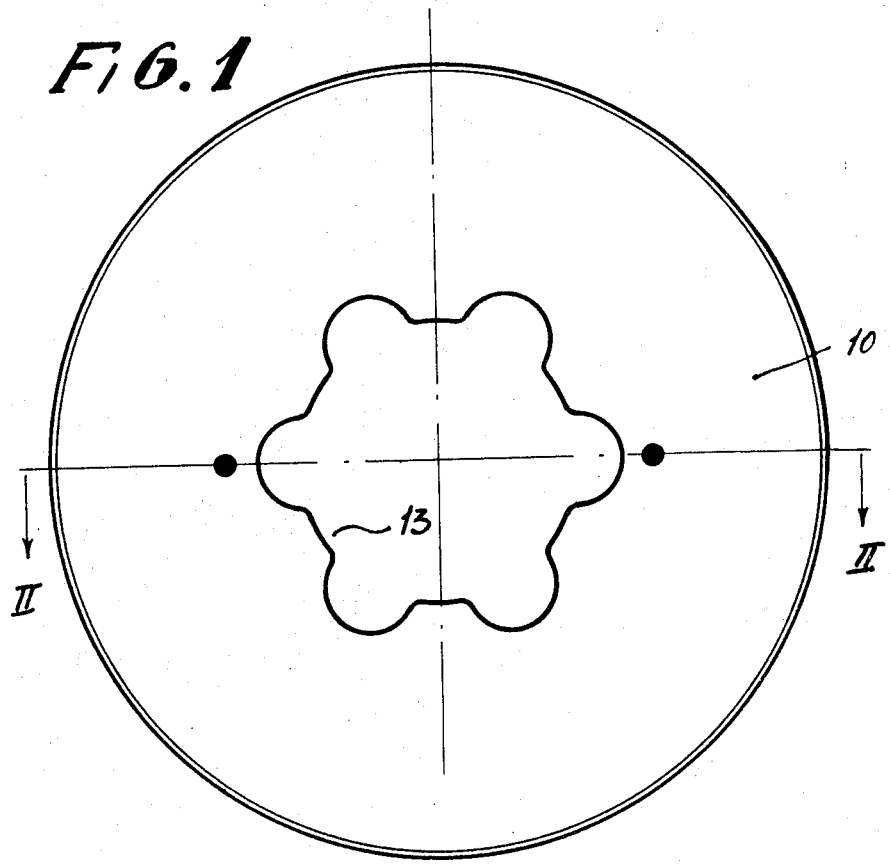
Figure 2:
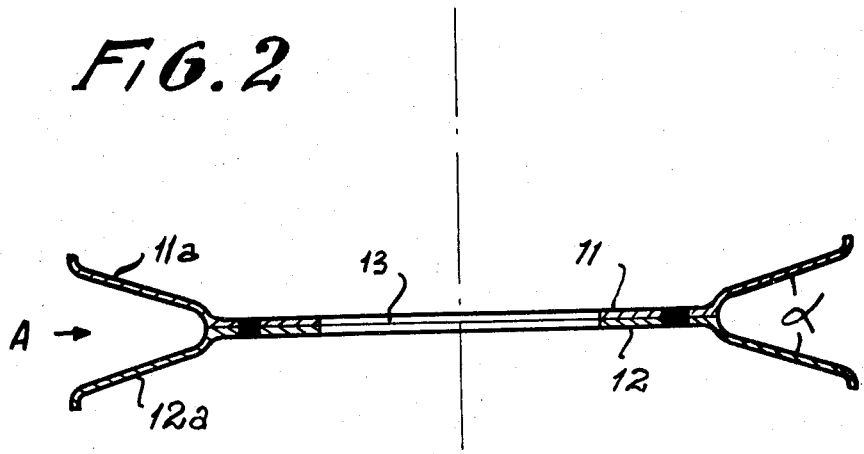

With reference to FIGS. 1 and 2 of the drawings, the illustrated embedded reinforcement is formed of a metallic disc 10 comprising a pair of parallel members 11, 12 of, preferably, the same diameter.

The perimetrical edges 11a and 12a of each member 11, 12 are bent in such a way as to form a groove A therebetween when said members 11 and 12 are coupled to each other or otherwise mutually and integrally connected, as represented in FIG. 2.

The angle alpha of groove A is determined by the symmetrical and opposed slope of the perimetrical edges 11a, 12a. It is obvious that said angle is selected with regard to the cross section of the belt which will operationally engage groove A.

Disc 10 is centrally provided with a seat 13 which, obviously, may have any outline other than that illustrated in FIG. 1. A metal bushing 14 (FIGS. 3 to 6) which is embedded within the hub 15 of pulley 16 passes through seat 13.

The extremity of perimetrical edges 11a, 12a of members 11, 12 is bent outwardly in order to provide a suitable anchorage for the reinforcing member in the molded plastics portion 16.

Figure 3:
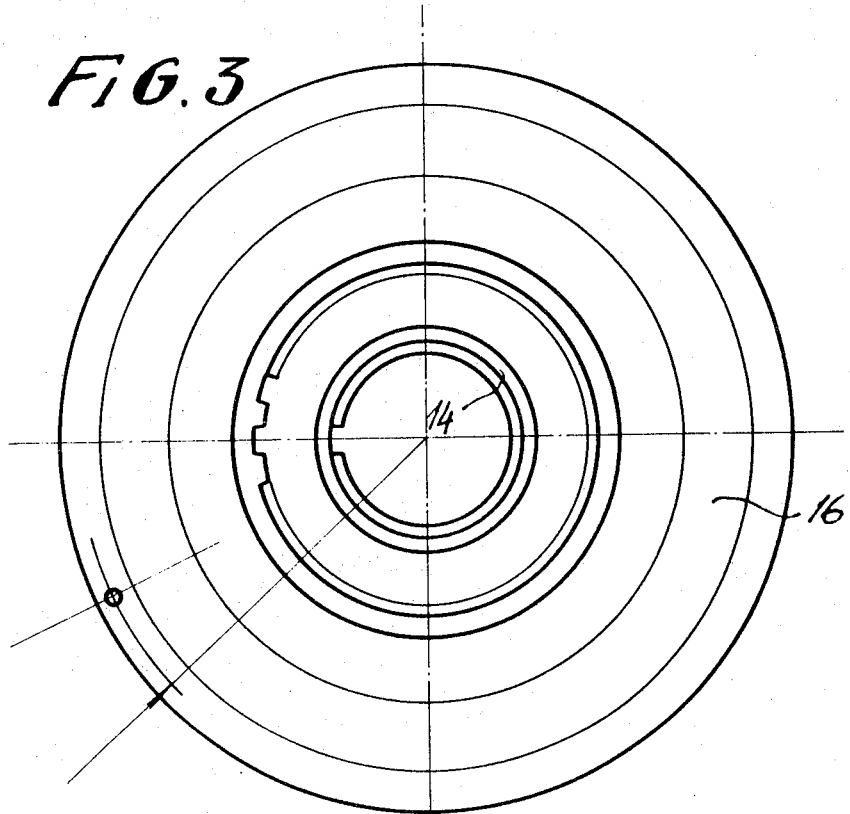
Figure 4:
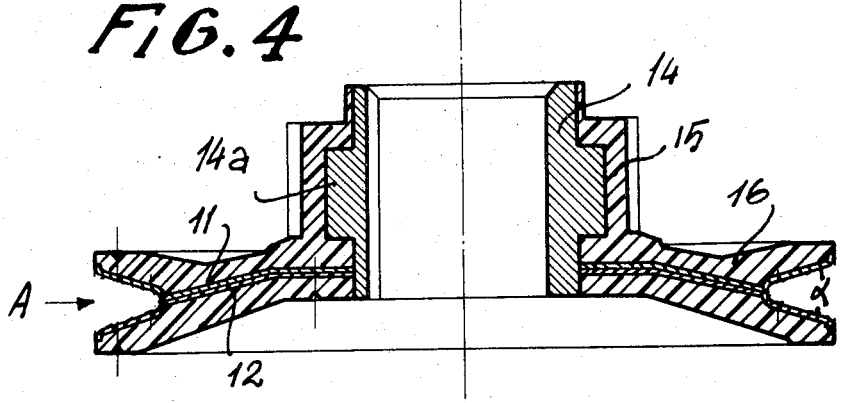

With particular reference to FIGS. 3 and 4, these represent a pulley of the type specifically intended to operate as a driving pulley for a water pump and an alternator in, for example, the engine of motor vehicles.

Due to the particular use requirements, said pulley, as clearly represented in FIG. 4, is provided on the front surface with a concave configuration, so that the reinforcement 11, 12 assumes, even in the central section of the pulley, a moderate cup-shaped appearance.

The metallic bushing 14 is provided with radial projections 14a intended to engage integrally the plastic hub 15 of the pulley. The reinforcement 11, 12 may be simply inserted on the skirt of bushing 14 or fastened to it by means of welding.

Figure 5:
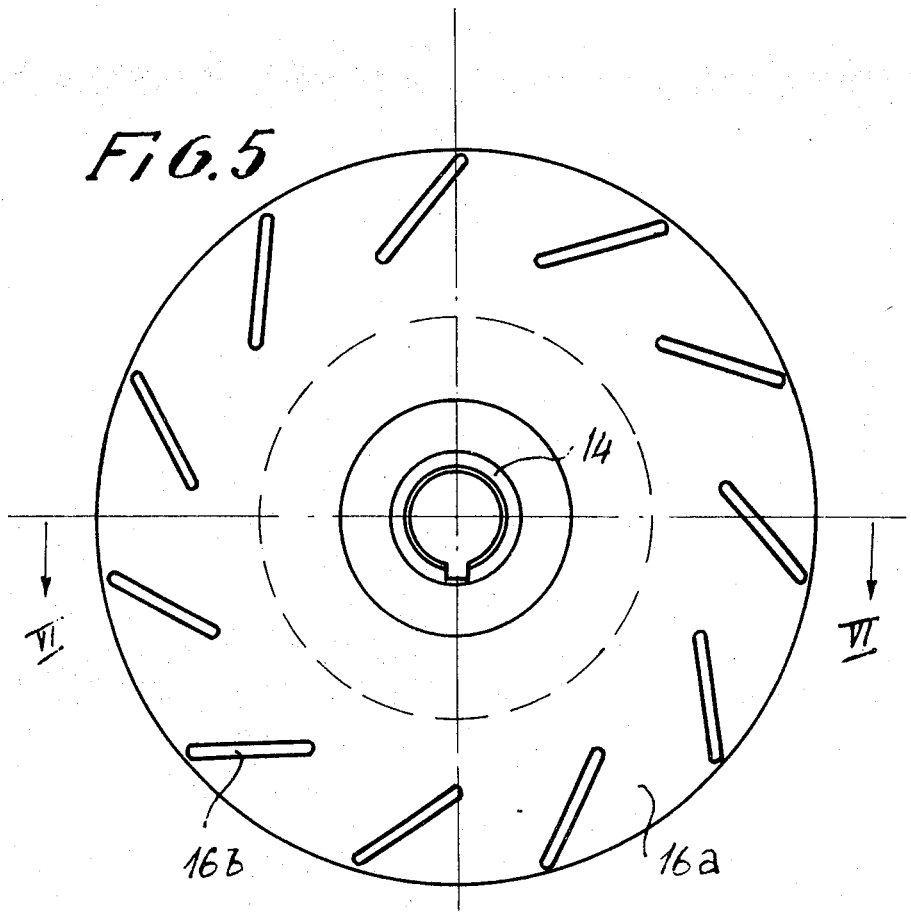
Figure 6:
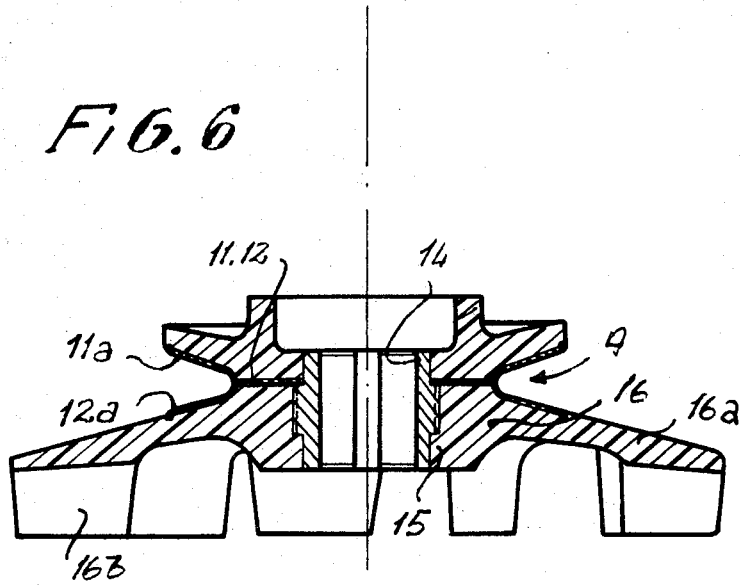

With particular reference now to FIGS. 5 and 6, these represent specifically a pulley with reinforcement of the type described and intended to be used as a driven pulley for an alternator and fan control.

As clearly represented on FIG. 6, the radial extension of edges 11a, 12a, forming groove A, is limited to the coupling region for the driving belt and does not reach to section 16a provided with front paddles 16b, in that this latter section is subjected to stresses considerably lower than the stresses acting on the section wherein the groove A is formed.

According to the invention, the pulleys made of molded plastics and provided with the described reinforcement substitute validly any equivalent metallic pulleys, with the additional advantages particularly in the field of engines for motor vehicles, where they may be used in the various transmissions of angular motion, as driving as well as driven pulleys.

The advantages derived from their use are both economical and practical, because of the reduced weight of the pulley with respect to the metallic pulleys, without loss in stress - and heat-resistance.

It is to be understood that the improvement according to the present invention is not limited to the above description and represented examples, but it comprises variations in shape and structure of both pulleys and embedded reinforcements, without departing from the scope and spirit of the invention.

What is claimed and is wished to secure by Letters Patent of the United States is:

1. A pulley comprising:
   a. a diaphragm including a pair of parallel, metallic plates rigidly secured to each other, a central opening extending through said plates with the axis of said opening being substantially perpendicular to the planes of said plates and a peripheral flange integral with the radially outer end of each said plate, said flanges being at an angle with respect to the planes of said plates and with respect to each other for defining, in combination, a peripheral, substantially V-shaped groove;
   b. a metallic bushing mounted in said opening and rigidly secured to said diaphragm; and
   c. a plastic layer covering the oppositely directed surfaces of said diaphragm, the outwardly directed surfaces of said flanges and the outside surface of said bushing whereby the confronting surfaces of said V-shaped groove are exposed.

2. The pulley in accordance with claim 1 wherein the periphery of each said flange includes an outwardly directed lip that is captured in said plastic.

3. The pulley in accordance with claim 1 wherein said bushing includes a radially extending projection that is embedded in said plastic layer.

4. The pulley in accordance with claim 1 wherein said plastic layer extends radially beyond the periphery of one of said flanges.

5. The pulley in accordance with claim 4 wherein said portion of said plastic layer extending radially beyond said flange includes a plurality of generally axially oriented paddles.

* * * * *